Dec. 11, 1956     D. SMITH     2,773,710
BIMETALLIC COUPLING FOR FLANGED PIPE FITTINGS
Filed Dec. 9, 1954
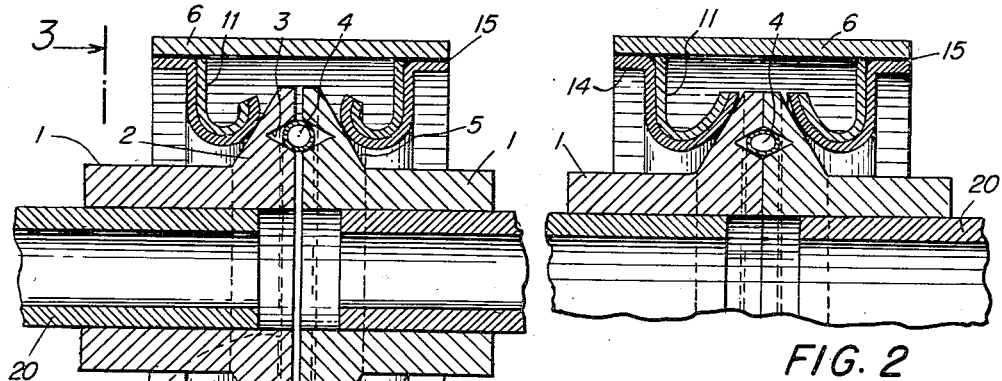
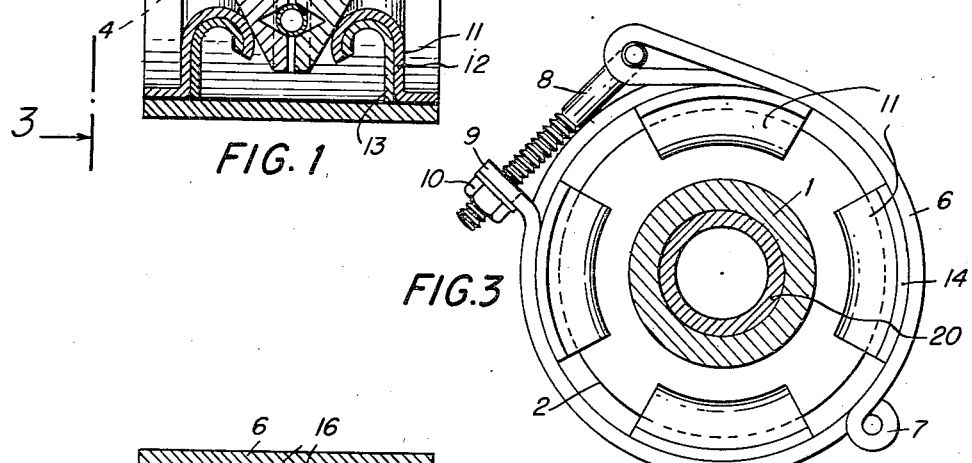
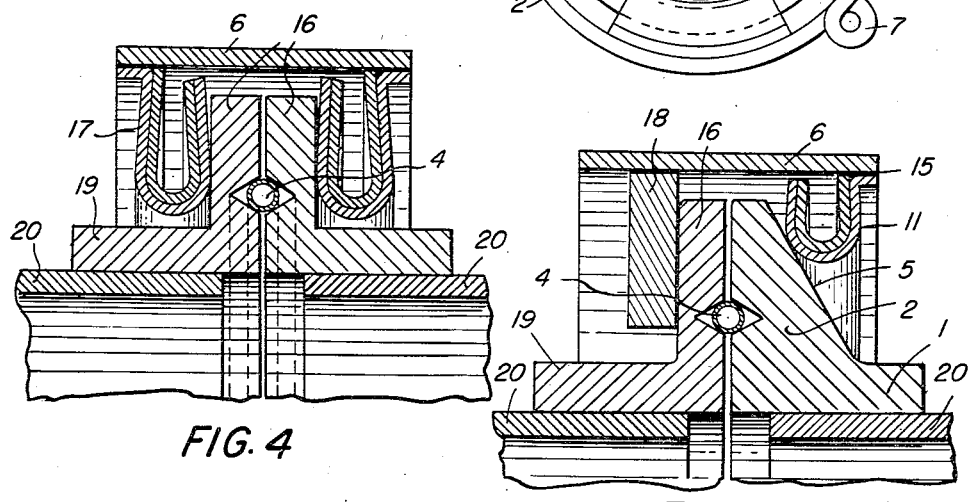
Inventor
Douglas Smith
By his attorneys
Howson and Howson

United States Patent Office 2,773,710
Patented Dec. 11, 1956

2,773,710

BIMETALLIC COUPLING FOR FLANGED PIPE FITTINGS

Douglas Smith, South Norwalk, Conn.

Application December 9, 1954, Serial No. 474,072

7 Claims. (Cl. 285—187)

This invention relates to a coupling or pipe joint to join two flanged pipe ends or other pipe fittings together, particularly where high temperatures or pressures are involved. In jet engines, aircraft and guided missiles, and in other technical fields, it is necessary to have a quick disconnect clamp or coupling at various points in the apparatus to join pipe ends together. The usual way of doing this at the present time is to use flanged pipe ends and an external clamp that is pulled tight around the flanges by means of a bolt. For low temperature work this is satisfactory but at elevated temperatures such as 500° F. or higher, which occur in jet engines, aircraft and guided missiles, it has been found that the heat expansion of the clamp itself makes it difficult to maintain the tightness of the joint. According to the present invention a plurality of curled, temperature-responsive, bimetallic elements are employed on the clamp. These are arranged in such a manner that the proper tightness in the joint is maintained at all times.

In the drawings,

Fig. 1 is a view in section through a preferred embodiment of a pipe coupling made in accordance with my invention, the view being taken longitudinally through the coupling while it is at ambient temperature.

Fig. 2 is a similar view in section of one edge of the same coupling at an elevated temperature.

Fig. 3 is a view in cross section through a coupling such as used in Fig. 1, taken on the line 3—3 of Fig. 1.

Fig. 4 is a view in longitudinal section of an embodiment of a pipe coupling according to my invention having parallel-sided flanges, only one edge of the pipe and clamp being shown, as in Fig. 2.

Fig. 5 is a view similar to Fig. 4, of a third embodiment of a pipe coupling according to my invention in which bimetallic elements are employed on only one side of the joint.

When it is desired to couple two pipe ends together or put a closure on a bottle and speed of connection is not a consideration, the usual way of making such a coupling is to use flanged pipe ends fastened together by a plurality of bolts passing through the flanges. Each bolt has to be tightened up individually. Where a quick disconnect coupling is required it has been known to use pipe ends where the sides of the flanges away from the ends of the pipes are sloped. When two such pipe ends are juxtaposed, an external V-shaped rib is formed on the pipe and it has been known to fasten these together by means of a hinged clamp fitting around the outside of the flanges. This clamp or ring is brought up tight by means of a bolt, screw, ring or other device. One form of such a prior art device is one in which the interior of the clamp presents a tapered V-surface to the flanges on the pipes. At elevated temperatures, however, this clamp and its V-surface expand radially and the fluid (gas or liquid) tends to leak between the pipe ends. For this reason such a device is not entirely satisfactory at high temperatures, and efforts have been made to provide a construction avoiding this difficulty.

In Fig. 1 there is shown a view in vertical section taken longitudinally of the pipes, of a preferred embodiment of the invention with the parts in the positions they would occupy at ambient temperature. By "ambient" temperature it should be understood that I mean the adjacent temperature either inside or outside the pipes. As can be seen in Fig. 1, each pipe end 20 has a sleeve 1 with a radially projecting flange 2 welded on the pipe. There is a notch 3 on the side of the flange toward the end of the pipe. This notch is to hold a gasket 4. The notches as shown each contain an angle of about 60° and the two opposed notches are just large enough to be filled by the gasket when the two flanges are in tight contact as shown in Fig. 2. The side 5 of each flange away from the end of the pipe is bevelled or tapered. The coupling comprises a clamp having an external open band 6 adapted to be placed over the outside of the flanged ends. The band may have a hinge 7 at the point in its periphery 180° distant from the two separate ends of the band. When the band has been placed around the pipe ends, bolt means of any desired type can be employed to pull the ends together and thus tighten the band around the flanged pipe ends. In Fig. 3 I have shown a bolt 8 attached to one end of the band and a notched end 9 to receive the bolt and to be held by a nut 10. It will be noted the parts are so proportioned that the pipe ends are pressed together by the means which I will now describe, before the band 6 is drawn down small enough to come in contact with the periphery of the flanges 2 on the pipe ends.

The elements or portion of the band which will now be described are adapted to provide the necessary components of pressure longitudinally of the pipes to draw the pipe ends together at both ambient temperature and at higher temperatures so as to get the tight joint regardless of temperature. To give this functioning I use curled, flexible bimetallic elements 11 which have the property of varying their shape or dimensions in response to variations in their heat content. These are fastened on the inner face of the band and acting as depending means they serve to bracket the two pipe flanges. These means depend from the band or ring at axially spaced points. My curled elements being bimetallic, have inner and outer layers, and the inner layer has a higher coefficient of expansion than the external layer. In the example shown in Figs. 1 and 2, each bimetallic element 11 comprises a curled strip 12 of stainless steel or the like, inside which has been curled a copper strip 13. Other metals having cofficients of expansion different from the element 11 can be used. When there is no fluid passing through the pipes, i. e., at normal ambient temperature, the curl of each of these bimetallic elements seen in cross section froms a U. One leg of the U is fastened to the band with the element extending from it toward the flanges 2, and the free end of the U is outside the flanges and facing toward the center of the pipe joint. In the embodiment of this drawing the stainless steel strip is slightly longer than the copper strip at the end where it is fastened to the band, the welding to the band taking place with this stainless steel end 14 and with the copper. In the example of Figs. 1 and 2 I provide four such elements 11 on each side of the joint, making a total of eight bimetallic elements. It will be noted that when the metal is at ambient temperature the free ends of the elements have a point of contact with the bevels of the flanges at a line distant from the ends of the free legs of the U. It will also be noted that these bimetallic elements are pressing against the flanges and holding the two pipe ends together by spring action, although the band has not yet been contracted far enough to contact the periphery of the flanges. The spring in the bimetallic strip thus takes care of low temperatures as the strip is under spring tension as soon as the band is drawn up. In Figs. 1, 4 and 5 the flanges are shown separated a slight distance for clarity, although they are not separated in actual practice, even at ambient temperatures, after the nut 10 is tightened.

I prefer to shape and proportion the parts as follows, although this is not absolutely essential. If one considers the angle formed by the band on a line longitudinal of the pipes and a line drawn from the point of contact of the outer edge 15 of the band and the welded end of the bimetallic element through the point of contact of the element with the bevel on the flange, it will be found that that angle is approximately equal to the angle between the pipe end and the flange bevel. It will also be noted that a line drawn through the point where the bimetallic element is welded to the band and the point of contact of that bimetallic element with the bevel passes approximately through the gasket. With this angular arrangement it will be obvious that my bimetallic elements tend to press the pipe ends together by powerful components of force. If a fluid at high temperature is introduced in the pipes or the external temperature becomes high, the band will become heated and tend to expand (see Fig. 2). This, of course, has a tendency to reduce the components of force holding the pipe ends together and if high pressures are involved, leakage might occur if it were not for the compensating force which my construction brings into play at this time. The coefficients of expansion of the two metals in my bimetallic elements are such that when there is a rise in the temperature these elements change their shape and tend to uncurl somewhat. This has the effect of increasing the distance from the point of weld between the bimetallic elements in the band, on the one hand, and the point of contact of the bimetallic elements with the flanges, on the other. Due to their effort to straighten out, the elements introduce a compensation which results in maintenance of the necessary pressure at high temperatures in spite of the coefficient of expansion of the parts involved. It will be seen, therefore, that my bimetallic elements, acting in opposition to each other, give the necessary tightness both at ordinary ambient temperatures and at high temperatures and high pressures to maintain a tight joint.

In Fig. 4 I have shown one side of a longitudinal section through a modified embodiment of my invention in which the flanges 16 are not bevelled on the sides away from the ends of pipes 19. The action is very similar to the preferred embodiment, the point of contact between the bimetallic elements 17 and the flanges 16 moving radially outward a slight distance as the temperature of the parts increases, but the pressure given by the bimetallic elements having a major component of force which tends to keep the flanges together, as in the case of the construction of Figs. 1, 2 and 3.

In Fig. 5 there is shown in longitudinal section similar to Fig. 4, a second modification of my clamp. Fig. 5 shows that it is not always necessary to provide bimetallic elements on both sides of the flanges. In this construction the flange 2 and bimetallic elements 11 on the right side of the joint as seen in this figure are similar to those in Figs. 1 and 2 but the flange 16 on the pipe end at the left is similar to one of the flanges shown in Fig. 4. Instead of bimetallic elements on the left there is shown a stop which is a solid block 18 backing up the flange. By this means the bimetallic elements on the right have something solid against which to exert their pressure and keep the pipe ends together.

While in the drawings I have shown a gasket of a ring type which is substantially round in cross section, it should be obvious that if desired other forms of gasket can be used and also that a pipe joint without a gasket per se could be coupled together in a tight manner by my invention. This invention can be used at any conduit tube, duct or pipe joint or other point where pipe ends or a pipe and a closure cap or other pipe fitting, such as a bottle and cap, are to be connected together quickly.

My copending patent application Serial No. 524,771, filed July 27, 1955, for "Exterior Coupling For Flanged Pipe Fittings," and my copending application Serial No. 558,505, filed January 11, 1956, for "Bimetallic Coupling For Flanged Pipe Elements," which last-mentioned application has now matured into Patent No. 2,773,709, dated December 11, 1956, show structures coming under the claims of this patent.

It will be seen that my coupling provides a tight joint at both ordinary and high temperatures and yet can be coupled or uncoupled quickly.

What is claimed is:

1. An exterior coupling for joining two pipe fittings each having a flange on the end, comprising the combination of a clamping ring with means thereon adapted to tighten the ring around the pipe flanges and axially-spaced means depending from the same side of the ring adapted to bracket the two opposed flanges; at least one of said axially-spaced means including curled internal and external layered bimetallic elements adapted to be located on one side of at least one of the flanges and each having one leg attached to the ring and a free leg adapted to contact the flange with the same external metal as the leg attached to the ring, the internal layer having a higher coefficient of expansion than the external layer so that upon increase in temperature the elements tend to straighten out, thereby being adapted to press tighter against the flange.

2. An exterior coupling for joining two pipe fittings, comprising the combination of opposed flanges on the ends of the fittings, a clamping ring surrounding said flanges with means on said ring to tighten the ring around the flanges, and axially-spaced means depending from the same side of the ring and bracketing the two opposed flanges, the axially-spaced means including, on at least one side of the flanges, curled internal and external layered bimetallic elements with free legs facing toward and adapted to push the flanges together; the internal layer having a higher coefficient of expansion than the external layer so that upon increase in temperature the elements tend to straighten out and press tighter against the flanges; whereby tightness of the joint is maintained at all temperatures.

3. A coupling according to claim 2 in which at least one of the flanges on the end of one of said pipe fittings is bevelled on the side away from said end and there is a notch receiving a gasket in the side of said one flange toward said end, the parts being so shaped and proportioned that the angle in cross section between the edge of the clamping ring and the point of contact of each bimetallic element with the flange bevel is substantially equal to the angle between the end of the fitting and the flange bevel.

4. A coupling according to claim 2 in which the flange of each pipe fitting is bevelled on the side away from the end of the fitting and there is a notch receiving a gasket in the side of each flange toward said end, the parts being so shaped and proportioned that a line drawn from the point where a bimetallic element is fastened to the clamping ring and passing through the points of contact of said bimetallic element with the flange bevel will approximately touch the gasket notch.

5. A coupling according to claim 2 in which there are bimetallic elements in back of the flange on one fitting and at one side of said clamping ring and a stop in back of the flange on the other fitting, at the other side of said clamping ring, whereby the bimetallic elements at said first mentioned side of the clamping ring bring the two pipe fittings together.

6. An exterior coupling for pipe fittings according to claim 2 in which the axially-spaced means include bimetallic elements on both sides of the two opposed flanges tending to push said two flanges together.

7. An exterior pipe coupling according to claim 2 in which the flange of each fitting end is bevelled on the side away from the end and is thinner at its outer edge than it is near the pipe, there being a notch receiving a gasket in the side of each flange toward the end of the fitting, the size and location of the bimetallic elements and of the bevels on the flanges being such that a line drawn from a point where a bimetallic element depends from the clamping ring and extending to the gasket notch will pass approximately through the point of contact of the free leg of the bimetallic element with the bevel on the flange.

References Cited in the file of this patent

UNITED STATES PATENTS

| | | |
|---|---|---|
| 1,007,326 | Boyd | Oct. 31, 1911 |
| 1,093,868 | Leighty | Apr. 21, 1914 |
| 2,271,425 | Harris | Jan. 27, 1942 |
| 2,575,213 | Fruth | Nov. 13, 1951 |
| 2,602,678 | Mahoff | July 8, 1952 |